United States Patent
Opitz et al.

(10) Patent No.: US 9,616,741 B2
(45) Date of Patent: Apr. 11, 2017

(54) VEHICLE COOLING ARRANGEMENT

(71) Applicant: AGCO INTERNATIONAL GMBH, Hesston, KS (US)

(72) Inventors: Marco Opitz, Marktoberdorf (DE); Alexander Barzen, Ettlingen (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 14/995,312

(22) PCT Filed: Jul. 21, 2014

(86) PCT No.: PCT/EP2014/065617
§ 371 (c)(1),
(2) Date: Jan. 14, 2016

(87) PCT Pub. No.: WO2015/007913
PCT Pub. Date: Jan. 22, 2015

(65) Prior Publication Data
US 2016/0288638 A1 Oct. 6, 2016

(30) Foreign Application Priority Data

Jul. 19, 2013 (GB) .................................. 1312941.6

(51) Int. Cl.
*B60K 11/00* (2006.01)
*B60K 11/04* (2006.01)
*F01P 5/06* (2006.01)
*B62D 25/10* (2006.01)

(52) U.S. Cl.
CPC ................ *B60K 11/04* (2013.01); *F01P 5/06* (2013.01); *B60Y 2200/221* (2013.01); *B60Y 2306/05* (2013.01); *B62D 25/10* (2013.01); *F01P 2070/50* (2013.01)

(58) Field of Classification Search
CPC .......... B60K 11/00; B60K 11/02; B60K 11/04; B60K 11/08
See application file for complete search history.

(56) References Cited

U.S. PATENT DOCUMENTS 6,435,264 B1 * 8/2002 Konno ................... B60K 11/04
123/41.49
2008/0236518 A1* 10/2008 Schaffer .................... F01P 5/06
123/41.49

FOREIGN PATENT DOCUMENTS

| DE | 3907926 A1 | 9/1990 |
| EP | 0096127 A1 | 12/1983 |
| EP | 0108479 A1 | 5/1984 |

(Continued)

OTHER PUBLICATIONS

European Patent Office, International Search Report for International Patent Application No. PCT/EP2014/065617, mailed Oct. 23, 2014.

(Continued)

*Primary Examiner* — John Walters
*Assistant Examiner* — James Triggs

(57) ABSTRACT

A vehicle engine cooling arrangement including a fan, a radiator and a mounting plate. The plate provides a fan mounting surface and a radiator mounting surface so that the fan and radiator are in a spaced arrangement. The plate extends from under the fan at the front of the vehicle to under the radiator downstream of the fan and guides air from the fan to the radiator.

9 Claims, 8 Drawing Sheets

(56) References Cited

FOREIGN PATENT DOCUMENTS

| | | |
|---|---|---|
| EP | 1167165 A1 | 1/2002 |
| EP | 1736348 A2 | 12/2006 |
| EP | 2522826 A2 | 11/2012 |
| FR | 2607759 A1 | 6/1988 |
| FR | 2632012 A1 | 12/1989 |
| KR | 20110133981 A | 12/2011 |
| WO | 8606689 A1 | 11/1986 |

OTHER PUBLICATIONS

Intellectual Property Office, International Search Report for UK priority application No. GB1312941.6, dated Jan. 24, 2014.

* cited by examiner

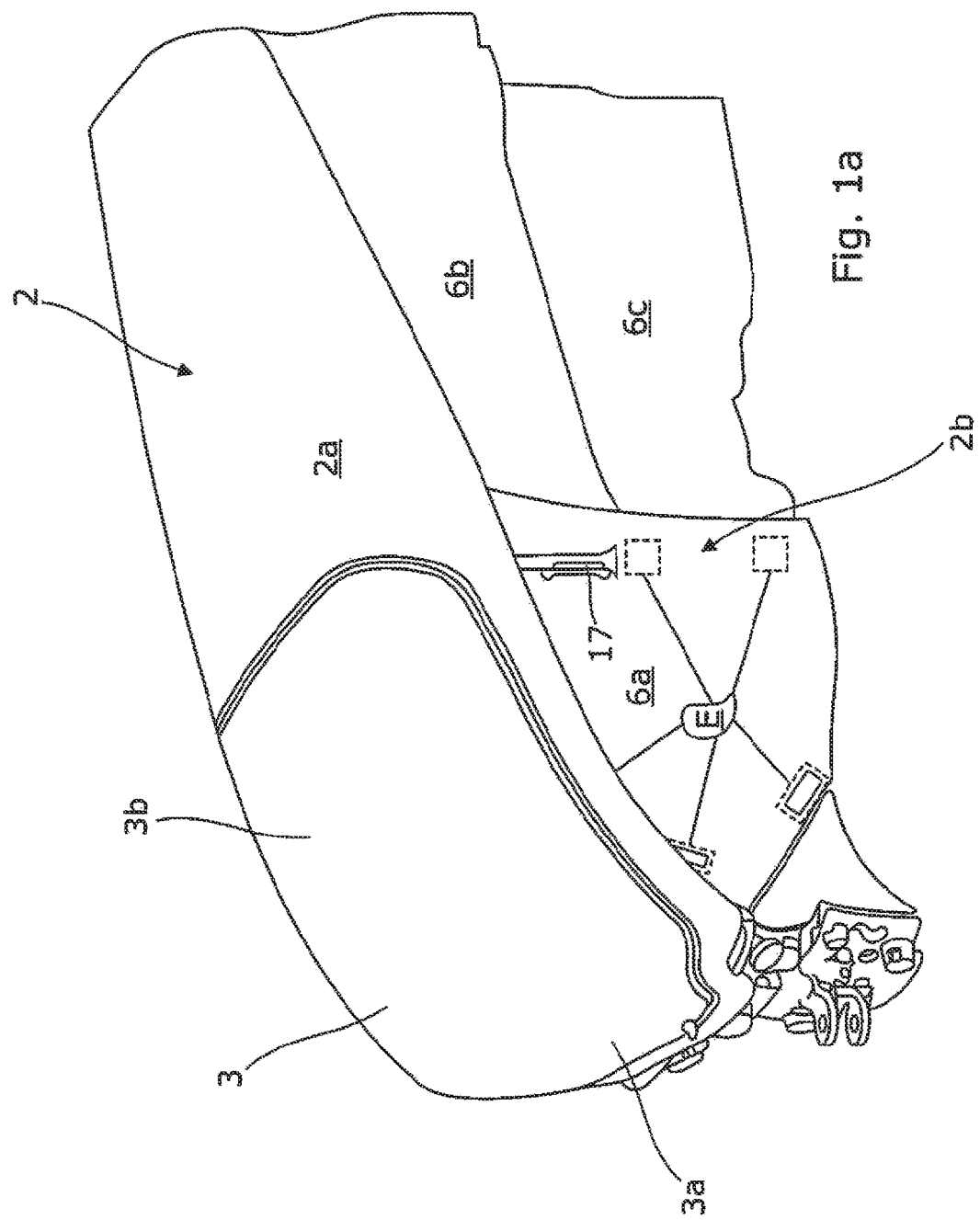

VEHICLE COOLING ARRANGEMENT

BACKGROUND OF THE INVENTION

Field of Invention

This invention relates to a vehicle cooling system. More specifically, this invention relates to an air cooling arrangement on an agricultural vehicle.

Description of Related Art

Agricultural vehicles, such as agricultural tractors require a number of radiators in order to cool working media, such as a water cooler for the engine, a transmission oil cooler, a hydraulic oil cooler, an intercooler and possibly a condenser for an air-conditioning system. It is common practice to arrange the radiators in series one after the other under a bonnet of the vehicle so that air from a fan positioned at the front of the vehicle drives air through the series of radiators. Radiators in this arrangement, however can result in creating a high resistance to air flow. To overcome the resistance, a larger fan may be required. The radiator arrangement may also interrupt the air flow resulting in overheating of the radiator or radiators.

A tractor driver must be able to see the implements attached to the front of the vehicle from the driver' seat which means the front bonnet must not be too high or long. There is also a desire for the front wheels of the vehicle to be steered as tightly as possible. For the front wheels to be able to turned as far as possible, the bonnet of the vehicle, in which the radiator sub-assembly is arranged, must be kept as narrow and low as possible. The radiator sub-assembly is therefore subject to substantial restrictions with respect to its dimensions particularly in width and height. Since the heat sink of the radiators cannot therefore be substantially increased, dissipation of the resultant waste heat presents difficulties, particularly because of the trend to constantly increase the drive power of the vehicle. In order to obtain satisfactory heat dissipation, the radiators are usually arranged in as series at different heights.

It is known to fix radiators to a carrier plate which is mounted to the tractor chassis. EP1849684 discloses a carrier plate which is fitted directly in front of the engine on an approximately horizontal level between two longitudinal frames of the chassis in the front axle region of the vehicle. Radiators are arranged on the plate in a series with the radiator nearest the engine being mounted on a lowered step of the plate to enable a taller radiator to be mounted. Such an arrangement does not optimise the air flow through the radiators and may necessitate a larger fan to obtain the desired air flow.

OVERVIEW OF THE INVENTION

An object of the present invention is to provide an improved vehicle engine cooling arrangement in which the air flow through the radiator is optimised.

According to the invention there is provided a vehicle engine cooling arrangement comprising a fan, a radiator and a mounting plate, said plate providing a fan mounting surface and a radiator mounting surface so that the fan and radiator are in a spaced arrangement, said plate extending from under the fan at the front of the vehicle to under the radiator downstream of the fan and wherein said mounting plate guides air from the fan to the radiator This has the advantage that the mounting plate provides an air guidance means for guiding air from the fan to the radiator, as well as providing a mounting surface for mounting the fan and a radiator to the vehicle.

Preferably the mounting plate comprises a sloped surface between the fan mounting surface and the radiator mounting surface.

Preferably the mounting plate forms a channel with a part of a fan shroud to guide air from the fan to the radiator. Thus, all air from the fan is channelled to the radiator.

Preferably the sloped surface forms a channel with a part of a fan shroud to channel air from the fan to the radiator.

The channel may be further formed from a part of a vehicle bonnet. The bonnet part may be a side panel of the bonnet. This arrangement provides a defined duct for the air to flow to the radiator.

Preferably the fan is titledly supported on the plate so that it is tilted towards the radiator and directs air flow along the plate. In this way the air is forced directly down and along the plate.

Preferably the plate is provided with a cooling device mounting surface downstream of the radiator mounting surface and which is positioned lower than the radiator mounting surface. This allows a taller cooler to be positioned on the mounting plate without affecting the overall height of the arrangement.

Preferably the plate is provided with attachment means for attaching a light or heater core.

More preferably, the plate is provided with bore holes for receiving pipes of the radiators and/or channels for delivering liquid to the radiators.

The plate preferably has a generally Z shaped profile when viewed from one side.

BRIEF DESCRIPTION OF THE DRAWINGS

The invention will now be described, by way of example only, with reference to the following drawings in which:

FIG. 1a is a perspective view of the bonnet of FIG. 1,

DETAILED DESCRIPTION OF THE INVENTION

Figure 1:
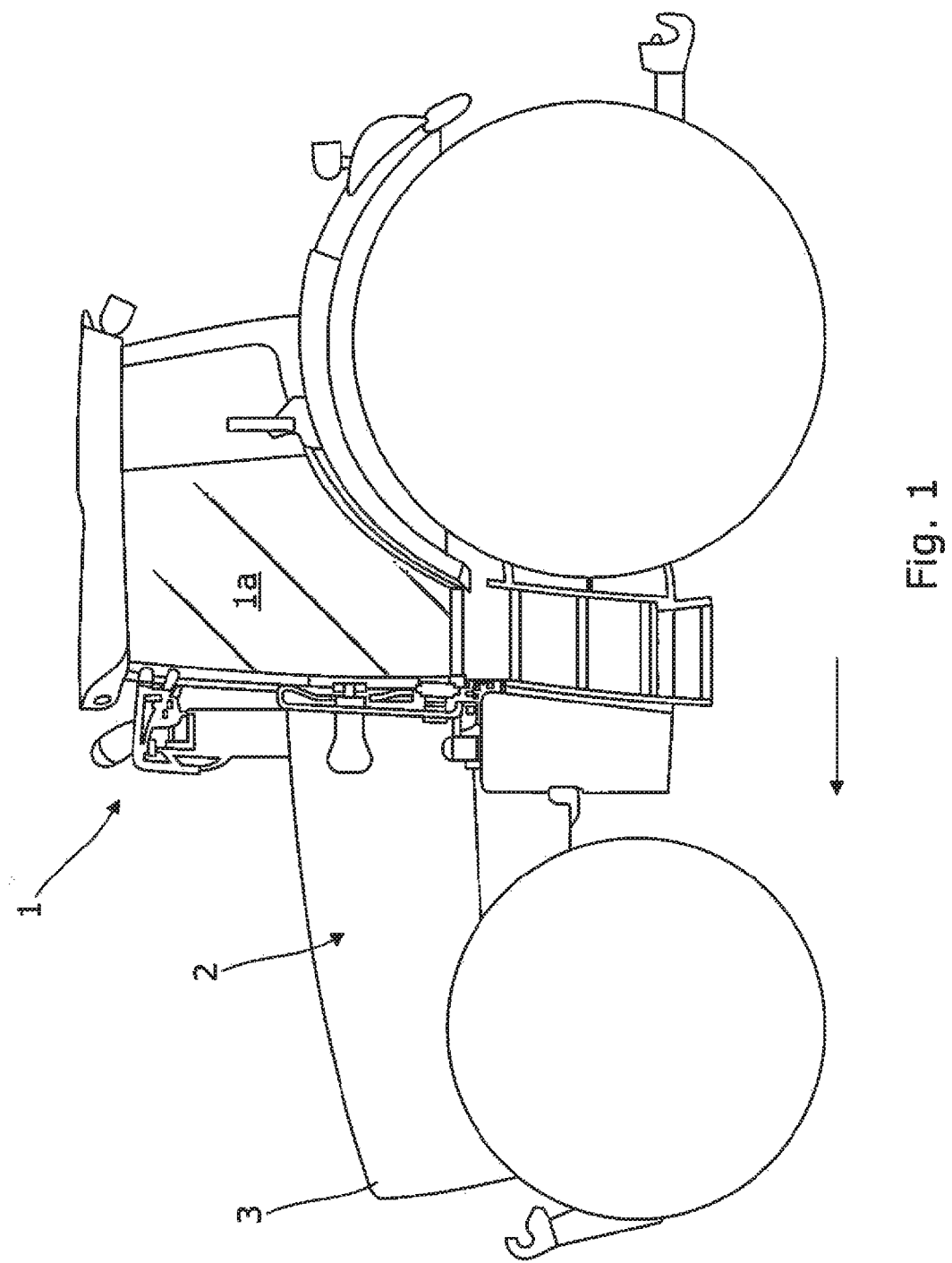
FIG. 1 is a side view of an agricultural tractor with the bonnet closed.

FIG. 1 is a side view of an agricultural tractor 1 having a front bonnet 2 which houses an engine and a cooling arrangement (not seen) in accordance with the invention. The bonnet 2 extends from a driver's cab la to the front of the tractor. A grill or mesh 3 is positioned at the front of the bonnet through which air passes and enters the cooling arrangement shown in FIGS. 2, 3 and 4. The arrow indicates the forward direction of travel.

FIG. 1a is a perspective view of the bonnet of FIG. 1. The bonnet 2 comprises a hood 2a and two opposing side parts 2b. When the bonnet 2 is closed as shown in FIGS. 1 and 1a, the hood 2a has a fairly flat upper surface which extends in a generally horizontal manner from the cab. Towards the front of the vehicle, the upper surface of the hood 2a starts to slope downwards and has an almost vertical front part at the front of the tractor. The hood 2a has an overhang which extends a small vertical distance along each of the two long opposing side edges. Each side of the bonnet 2 is formed from a side part 2b and the overhang of hood 2a. The front part of the hood 2a and a part of the upper surface of the hood is provided with the grill or mesh 3.

Figure 1B:
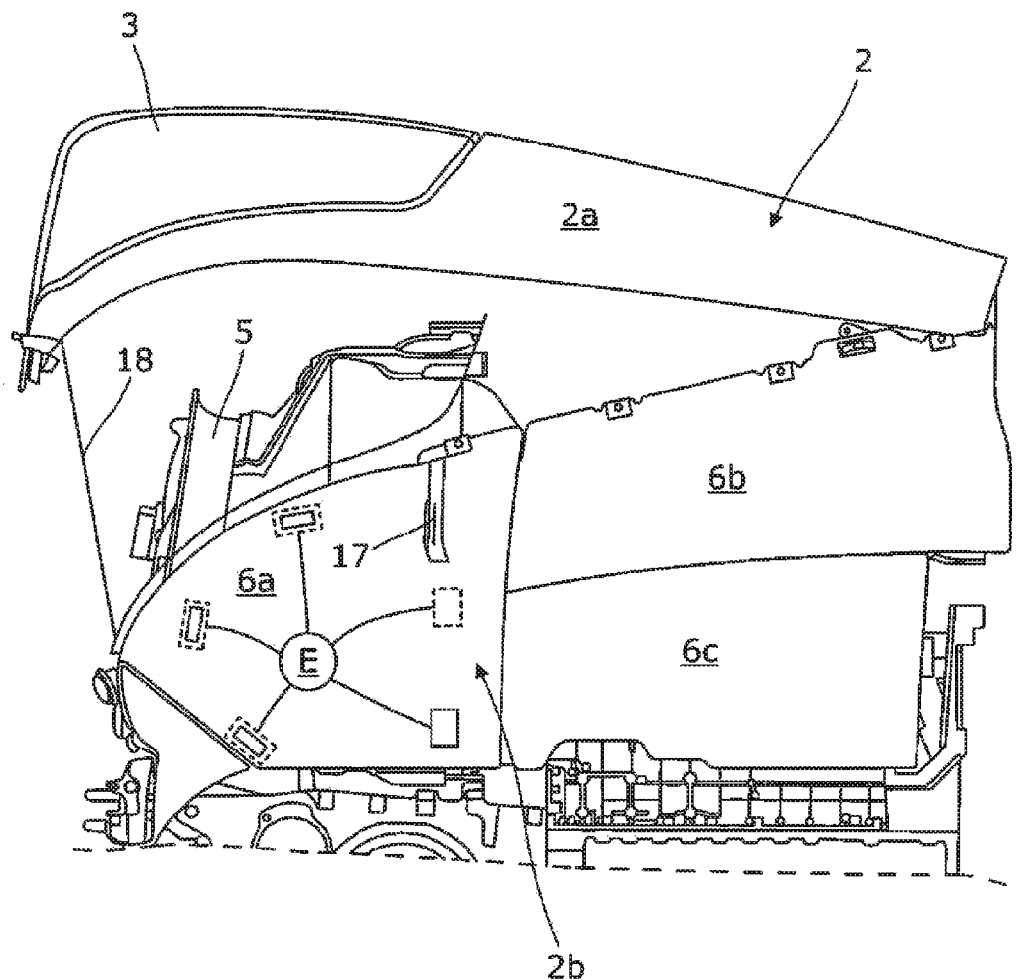
FIG. 1b is a side view of the bonnet of FIG. 1a with a hood of the bonnet raised in which a cooling arrangement in accordance with the invention is shown.

FIG. 1b is a side view of the bonnet 2 with the hood 2a in an open position. The hood 2a may be lifted to give access to the parts under it by pivoting it about a pivot axis located close to the cab 1a. When the hood 2a is lifted, it moves away from the side parts 2b. The larger the tractor, the higher is the front of the hood when pivoted open. In the open position, the hood is often too high for person to reach and then apply the necessary force to pivot it down to close it. The bonnet hood may be provided with a retractable belt 18 which extends between a spring mounted roller and an attaching means. Either one of the roller or attaching means is positioned on the hood 2a with the other part, attaching means or roller being positioned on the tractor, for example the chassis. When the hood 2a is open the belt extends vertically from the hood 2a to the chassis. To close the hood, the driver simply pulls a mid portion of the belt towards him or her which causes the hood to pivot downwards. As the hood 2a is closed, the belt retracts in length by the roller rolling the belt under tension from the roller spring.

Figure 6:
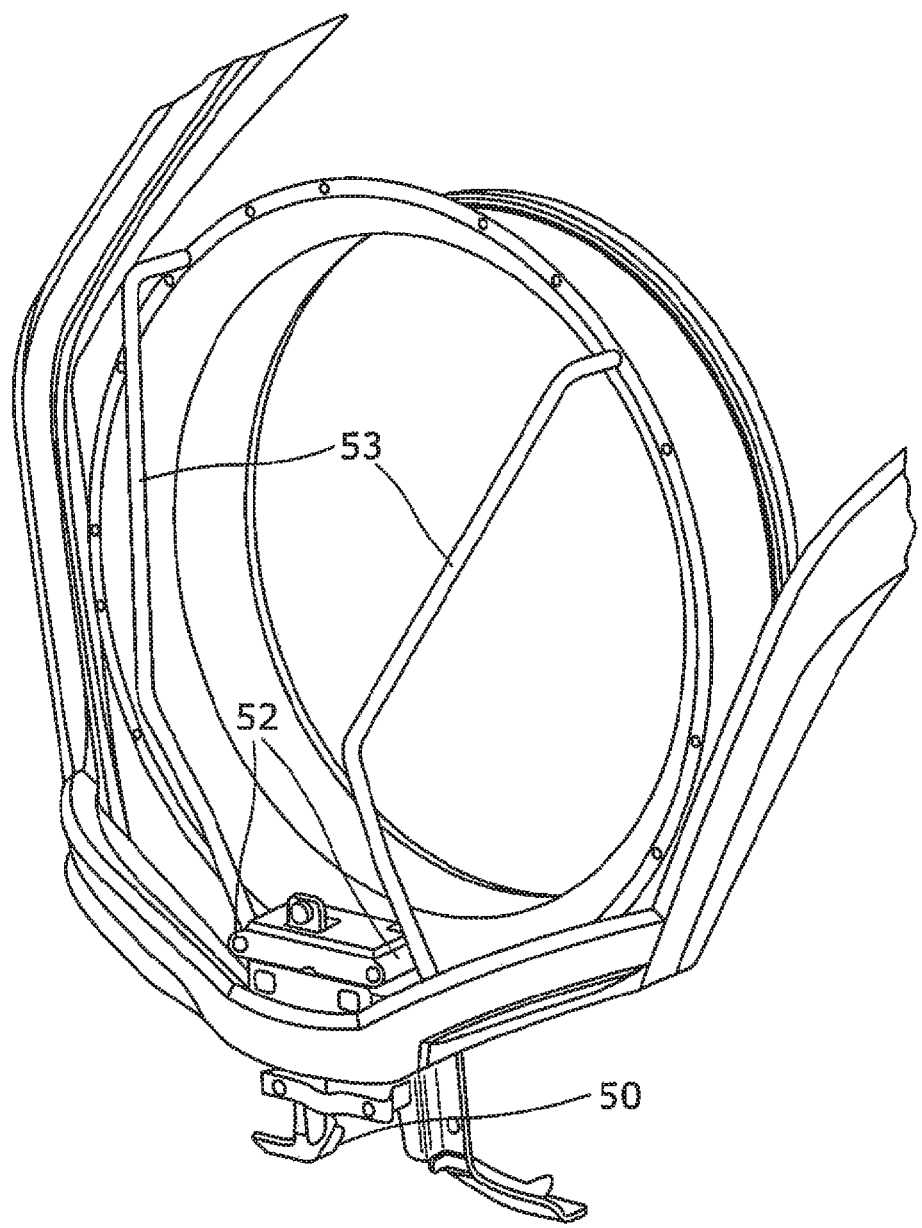
FIG. 6 shows a detailed view of the front of the vehicle of FIG. 4.

As shown in FIG. 6, the front of the hood is provided with a locking means 50 for securing the hood to a front part of the tractor in a closed position. Additionally, or alternatively for easy closure of the hood and to prevent damage to the hood, guidance means is provided comprising two rollers 52 and two tracks 53. In FIG. 6, the hood is provided with two rollers 52 either side of the locking means 50. Tracks 53 extend in a substantially upright manner from a front part of the tractor which enables the rollers 52 to roll between the tracks 53 and guide the locking means 50 to the front of the tractor for engagement as the hood is lowered.

Figure 3:
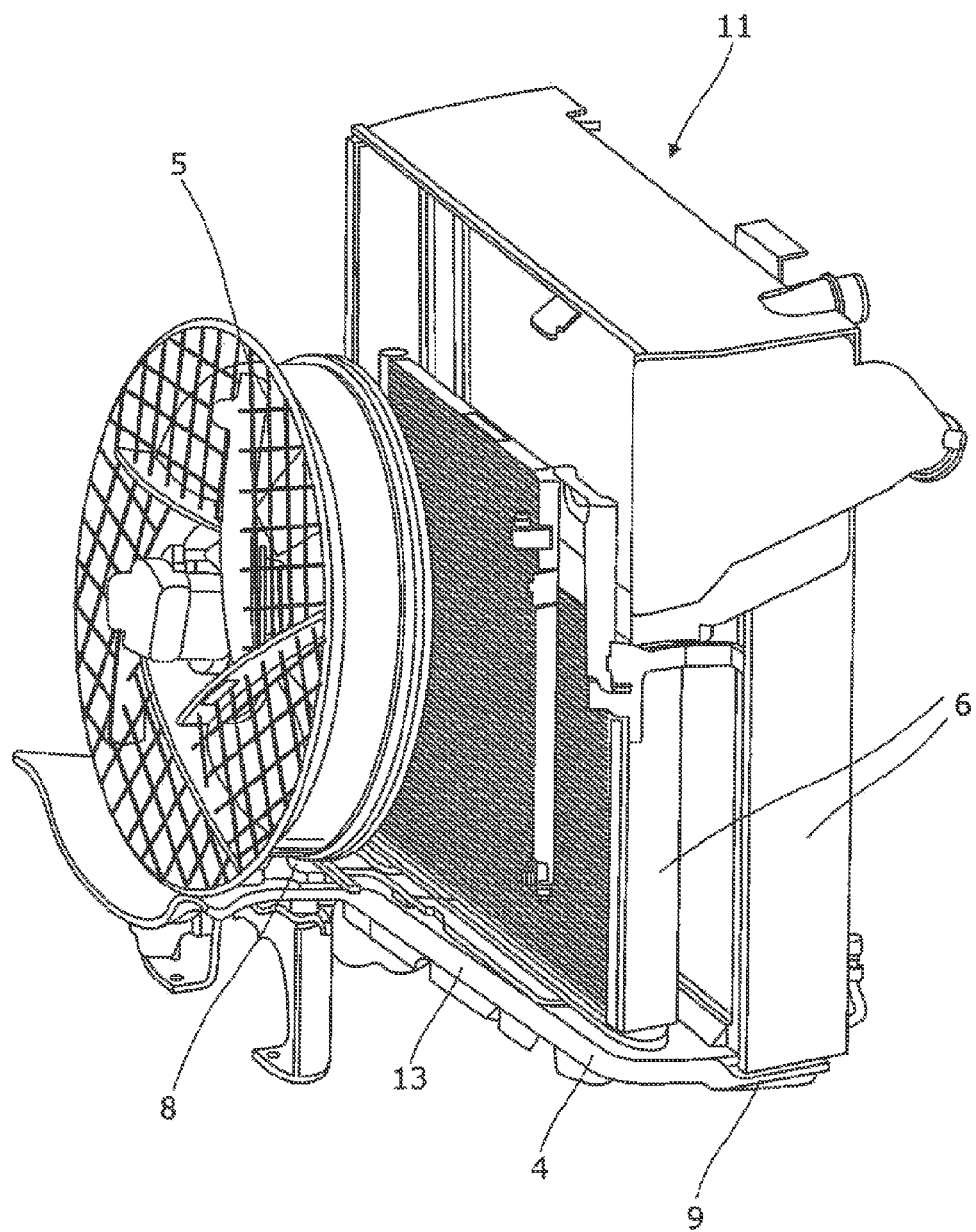

Each side part 2b comprises moveable side panels 6a, 6b and 6c (in which a grill may be integrated). Side panels 6a are located towards the front of the tractor and extend approximately from the fan 5 to radiators 6 as shown in FIG. 3. If more than one radiator 6 is fitted, the radiators are usually mounted in a series becoming increasingly closer towards the engine. Panels 6b and 6c are located towards the rear of the bonnet (that is in a direction towards the cab) and cover the engine. Moveable side panels 6a and 6b are pivotally attached to each side part 2b so that they can be moved with respect to the side parts to give access to components of the cooling system and/or engine system under the bonnet. The pivoting means may comprise spring means. Alternatively, side panels 6a and 6b may be fully, or partly removable from the side parts 2b to give access.

The edges of the panels 6a and 6b or the edges of the side parts 2b into which panels 6a and 6b fit are provided with a sealing means such as a rubber tubing 14 (FIG. 2) to prevent the escape of air to the atmosphere.

If side panel 6a is removable, it is attached to side part 2b by clamps and hooks at the locations marked E in FIGS. 1a and 1b. To enable the side panels 6a to be easily removed, a hand grip 17 can be provided on the side panels 6a which allows a person to easily get a grip of the panels.

Figure 2:
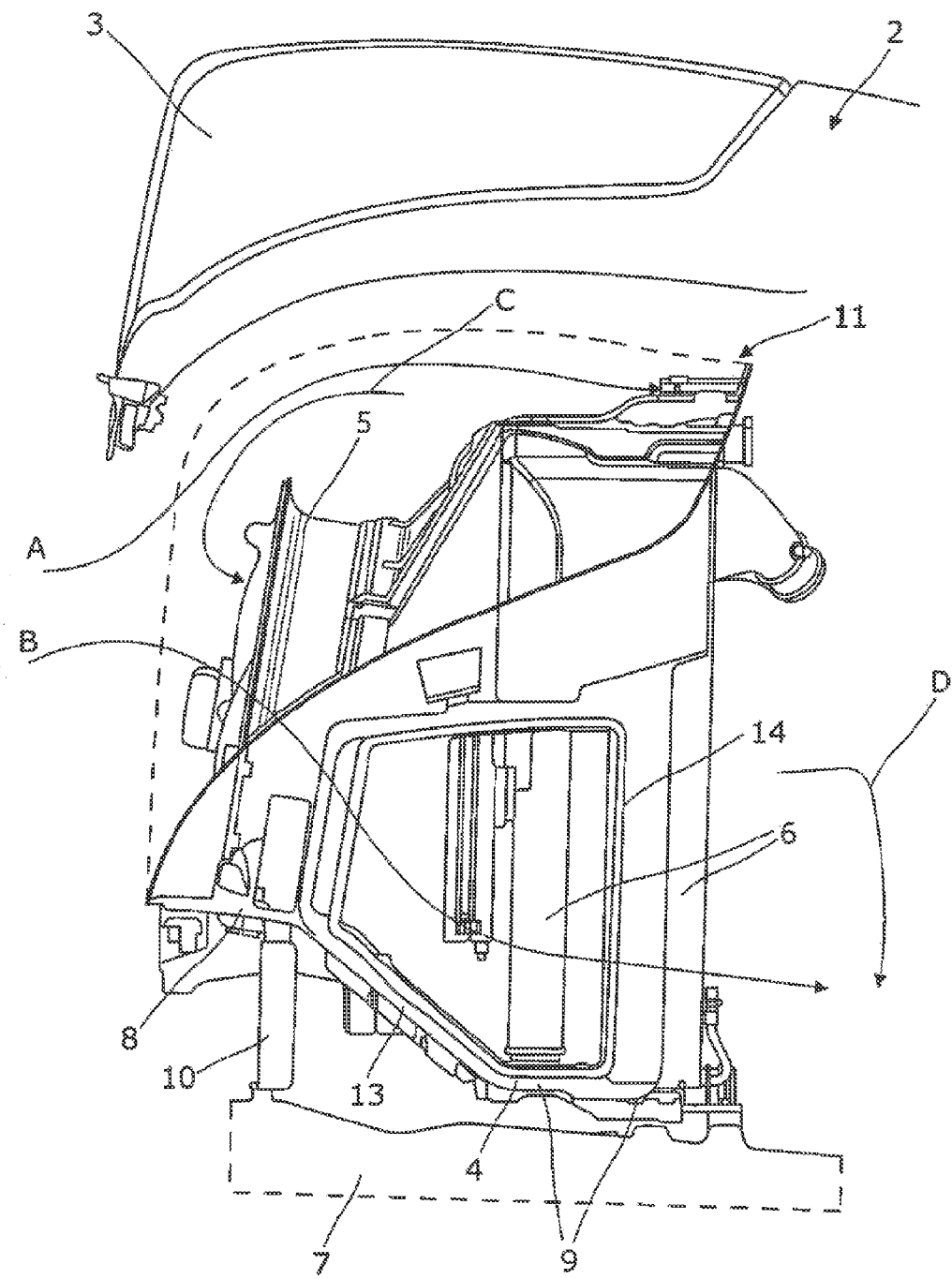
FIG. 2 is a side view of a front part of the tractor bonnet of FIG. 1b, and FIGS. 3 and 4 are perspective views of the cooling arrangement of FIG. 2 in which the bonnet panels and chassis are removed.

FIG. 2 is a side view of a front part of the bonnet 2 in which the side panel 6a has been omitted so that the cooling arrangement inside the bonnet can be seen. A mounting plate 4 is provided which extends from under the fan 5 which is positioned at the front of the tractor behind the grill 3 to under the radiator or radiators 6 which are positioned in front of the engine (not shown) with respect to the forward direction of travel of the tractor. The tractor is provided with two parallel frames 7 which form the chassis. The mounting plate 4 extends widthways across both frames 7 and is provided with a fan mounting surface 8 and radiator mounting surfaces 9. The side profile of the mounting plate 4 is that of a laterally extended Z in that the fan mounting surface 8 and radiator mounting surfaces 9 are generally horizontal and are connected by a sloping surface 13 such that the fan mounting surface is elevated with respect to the radiator mounting surfaces. Since the frames 7 are horizontal, a support element 10 fixes the front of the plate 4 under the fan mounting surface 8 to the frames 7. The support element 10 is affixed to the frames 7 by bolts. The radiator mounting surface 9 of the plate is secured directly to the frames 7 by bolt means. On the underside of the plate 4 at the area of the fan mounting surface 8, attachment means are provided for attaching a light or heater core thereto. In, or on the plate 4 at the area of the radiator mounting surface 9, bore holes and/or channels may be provided for receiving pipes from the radiator, or radiators 6 and/or for delivering liquid to the radiator or radiators 6.

Two air flows are indicated by arrows A and B. Air Arrow A shows an air flow for an air intake for the combustion of the engine and arrow B for cooling the radiators 6 and the engine. The fan 5 pushes air through the radiators 6 and the engine.

Figure 4:
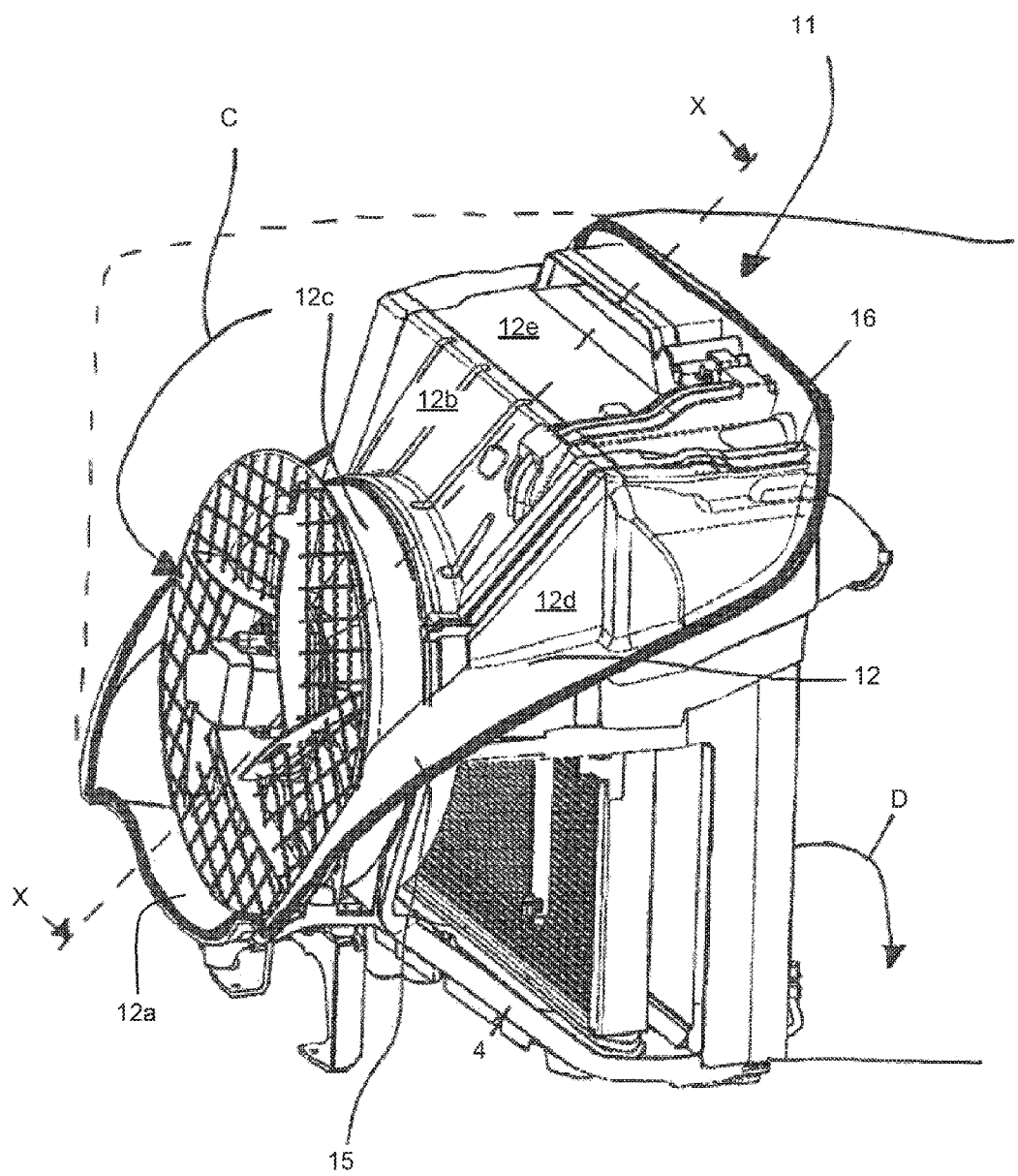

FIGS. 3 and 4 are perspective views of the cooling arrangement 11 in which the chassis and bonnet have been omitted. The difference between FIGS. 3 and 4 is that in FIG. 4 an extended fan shroud 12 is shown. As shown in FIGS. 3 and 4 fan 5 is mounted on mounting plate 4 so that it is tilted towards the radiators 6. Fan 5 is secured to the fan mounting surface 8 by fan attachment means extending through bores in the plate 4. Radiators 6 are attached in series to plate 4 by bolt means. The radiators 6 are in a spaced arrangement from the fan 5 with the fan mounting surface 8 at one end of the sloping surface 13 and the radiator mounting surfaces 9 at the other end.

The extended fan shroud is assembled from a number of parts bolted together. Preferably, the extended shroud comprises at least three or four parts. In FIG. 4 the extended fan shroud 12 is shown having a lower part 12a which extends from the bottom half of a fan ring 12c in a forward direction with respect to the forward direction of travel of the tractor and an upper part 12b which extends rearwards from the upper half of the fan ring 12c towards the radiators 6 over plate 4. The upper part 12b is formed by two side parts 12d (only one is shown in FIG. 4) and a central part 12e. Side parts 12d may therefore be connected to either side of central part 12e to from an upper part 12b. Alternatively, central part 12e could itself comprise two half parts, each of which is connected to a side part 12e to form the upper part 12b A flange 15 is provided with sealing means 16. The flange 15 extends from a lower part of the fan shroud 12a diagonally along opposing sides of the upper part 12b and across parts 12b and 12d of upper part 12b. Preferably the bonnet 2 may be provided with sealing means 16. Sealing means 16 may, for example comprise rubber tubing.

Figure 5:
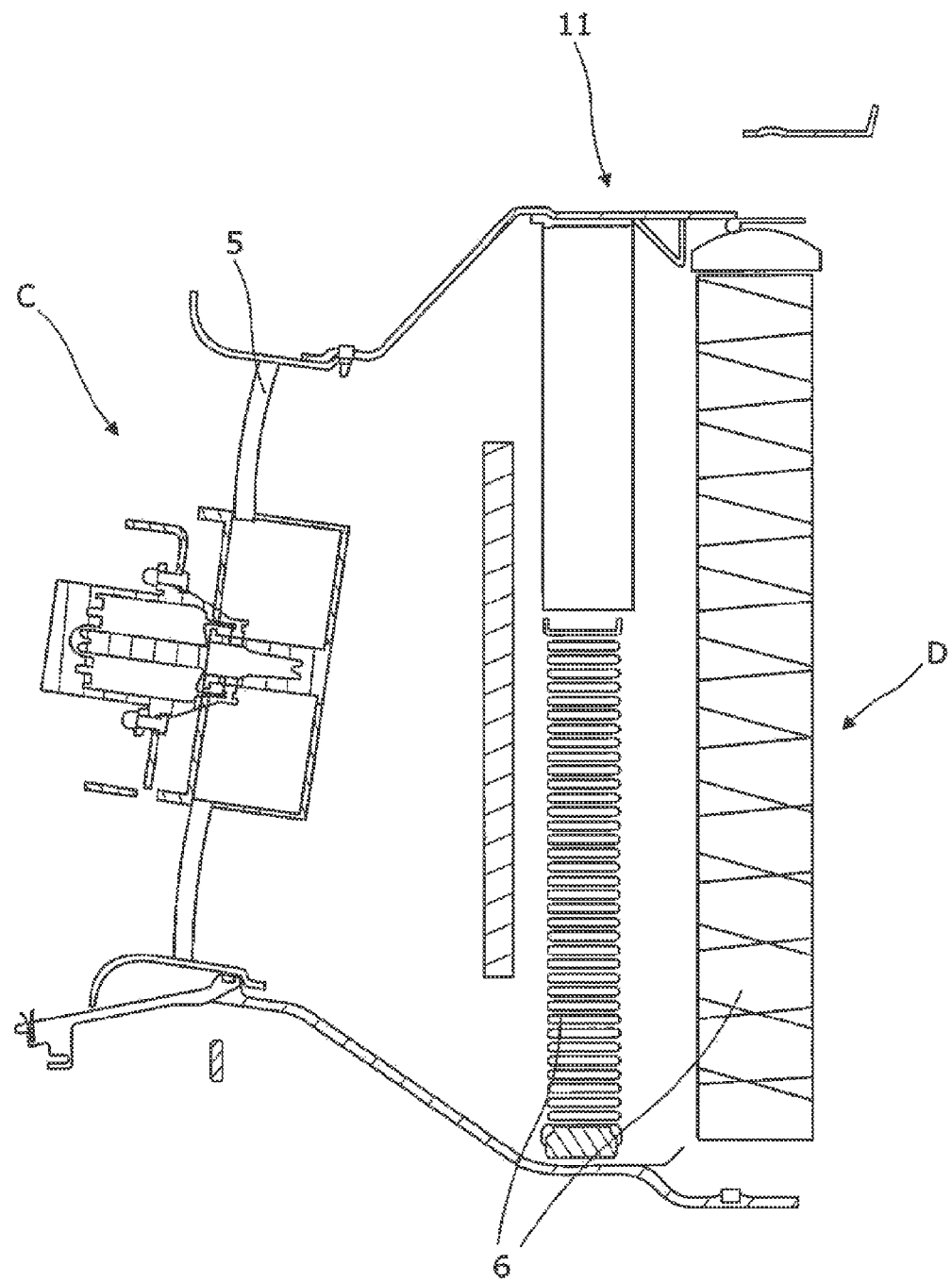
FIG. 5 shows a cross section along line X-X of FIG. 4 which shows the cooling arrangement.

In FIG. 5 the cooling arrangement 11 is shown. The cooling arrangement shown comprises a fan 5 and radiators 6 in which the radiators are located downstream of the fan. It is envisaged that the fan 5 and the radiators 6 could be arranged the other way around so that the radiators are mounted upstream of the fan. In such an arrangement, the radiators are mounted in front of the fan with respect to the forward direction of travel.

When the bonnet 2 is closed and in contact with the sealing means 16 two air compartments are defined. A first air compartment C and a second air compartment D. First air compartment C is partially positioned above cooling fan 5, between the grill 3 of hood 2a and extended fan shroud 12. Compartment C is a low pressure area. The dotted line in FIGS. 2 and 4 represents the grill 3 of the bonnet 2 when closed. With reference to figure 1a in which the bonnet is closed, grill 3 is formed in the hood 2a so that it has a vertical, or generally vertical part 3a and a generally horizontal part 3b. Grill part 3b extends from grill part 3a towards the rear of the vehicle past fan 5.

Second air compartment D is positioned downstream of the fan 5 and as shown herein is located behind the radiators 6. Compartment D is a high pressure area and is enclosed by the hood 2a, the flange 15 and bonnet side panels 6b, 6c. Air which passes through the radiators 6 enters compartment D and then flows out to the atmosphere through a grill mounted in panel 6c, or through the frames 7.

By compartment it is meant a partially or fully enclosed area in which the surface fully or partially enclosing the area may, or may not be airtight.

When the bonnet 2 is closed and sealed, the panels 6a form an extension of the fan shroud between lower part 12a and upper part 12b so that air is channelled between the upper part 12b, side panels 6a and mounting plate 4 to the radiator 6. As a result, a complete fan shroud which extends from the fan to the radiator is formed from the upper part 12b, side panels 6a and plate 4. Thereby the mounting plate 4 guides air directly to the radiators 6.

When the bonnet 2 is closed and the sealing means 16 contacts the bonnet 2 (or flange) two air compartments C and D are defined.

The invention claimed is:

1. An agricultural vehicle having a cooling system comprising a fan, a radiator and a mounting plate, said mounting plate providing a fan mounting surface and a radiator mounting surface so that the fan and radiator are in a spaced arrangement, said mounting plate extending from under the fan at the front of the vehicle to under the radiator downstream of the fan and wherein said mounting plate guides air from the fan to the radiator, wherein said mounting plate comprises a sloped surface between the fan mounting surface and the radiator mounting surface so that there is a difference in the relative heights of the two mounting surfaces and wherein the sloped surface forms a channel with a part of a fan shroud to chanel air from the fan to the radiator.

2. The agricultural vehicle as claimed in claim 1 wherein the channel is further formed from a part of a vehicle bonnet.

3. The agricultural vehicle arrangement as claimed in claim 1 in which the fan is tiltedly supported on the mounting plate so that it is tilted towards the radiator and directs air along the mounting plate.

4. The agricultural vehicle as claimed in claim 1 wherein said mounting plate is further provided with a cooling device mounting surface downstream of the radiator mounting surface and which is located lower than the radiator mounting surface.

5. The agricultural vehicle as claimed in claim 1 wherein the mounting plate is provided with attachment means for attaching a light or heater core.

6. The agricultural vehicle as claimed in claim 5 wherein the attachment means is on the underside of the mounting plate.

7. The agricultural vehicle as claimed in claim 1 wherein the mounting plate is provided with bore holes for receiving pipes of the radiators.

8. The agricultural vehicle as claimed in claim 1 wherein the mounting plate is provided with channels for delivering liquid to the radiators.

9. The agricultural vehicle as claimed in claim 1 wherein a side profile of the mounting plate is generally an extended Z shape.

\* \* \* \* \*